US007225900B2

(12) United States Patent
Fox

(10) Patent No.: US 7,225,900 B2
(45) Date of Patent: Jun. 5, 2007

(54) MOTORCYCLE LIFT

(75) Inventor: Robert Fox, Torrence, CA (US)

(73) Assignee: Norco Industries, Inc., Compton, CA (US)

(*) Notice: Subject to any disclaimer, the term of this patent is extended or adjusted under 35 U.S.C. 154(b) by 267 days.

(21) Appl. No.: 10/794,521

(22) Filed: Mar. 5, 2004

(65) Prior Publication Data

US 2004/0173407 A1 Sep. 9, 2004

Related U.S. Application Data

(60) Provisional application No. 60/452,848, filed on Mar. 7, 2003.

(51) Int. Cl.
*B66F 7/00* (2006.01)
*B66F 7/28* (2006.01)
*B60P 1/48* (2006.01)

(52) U.S. Cl. .......................... 187/204; 187/211; 254/8; 254/10

(58) Field of Classification Search ................ 187/204, 187/211; 254/10 B, 131
See application file for complete search history.

(56) References Cited

U.S. PATENT DOCUMENTS

| | | | | |
|---|---|---|---|---|
| 3,215,402 | A | 11/1965 | Hott et al. | |
| 3,655,082 | A | 4/1972 | Garrett | |
| 3,967,834 | A | 7/1976 | LaCharite | |
| 4,457,492 | A * | 7/1984 | Lahti | 254/8 B |
| 4,494,764 | A | 1/1985 | Kelley | |
| 4,599,034 | A | 7/1986 | Kennedy et al. | |
| 4,899,985 | A * | 2/1990 | Good | 254/8 B |
| 5,123,802 | A | 6/1992 | Bell | |
| 5,174,414 | A | 12/1992 | Burns | |
| 5,271,603 | A * | 12/1993 | White | 254/10 C |
| 5,358,265 | A | 10/1994 | Yaple | |
| 5,518,224 | A | 5/1996 | Anderson | |
| 5,588,639 | A | 12/1996 | Holman | |
| D378,155 | S | 2/1997 | Bartow et al. | |
| 5,601,277 | A | 2/1997 | Larson | |
| 5,769,396 | A | 6/1998 | Tischendorf | |
| 5,769,397 | A | 6/1998 | Dhein | |
| 5,839,875 | A | 11/1998 | Miller et al. | |
| 5,899,655 | A | 5/1999 | Miller et al. | |
| 5,979,878 | A | 11/1999 | Blankenship | |
| 6,070,699 | A | 6/2000 | Bleeker | |
| 6,092,787 | A | 7/2000 | Nayman | |
| 6,168,138 | B1 | 1/2001 | Dhein | |
| 6,286,814 | B1 | 9/2001 | Heyne | |
| 6,338,470 | B1 | 1/2002 | Steely et al. | |
| 6,341,763 | B1 | 1/2002 | Lefebvre | |
| 6,345,693 | B1 | 2/2002 | Yeo et al. | |
| 6,371,449 | B1 | 4/2002 | Chamberlain | |
| 6,439,346 | B1 | 8/2002 | Gradziuk | |
| 6,464,207 | B2 * | 10/2002 | Creel et al. | 254/131 |
| 6,561,487 | B2 * | 5/2003 | Siglock | 254/134 |
| 6,769,668 | B2 * | 8/2004 | Siglock | 254/124 |
| 6,966,542 | B2 * | 11/2005 | Bettencourt | 254/131 |

(Continued)

*Primary Examiner*—Gene O. Crawford
*Assistant Examiner*—Terrell Matthews
(74) *Attorney, Agent, or Firm*—Hahn Loeser & Parks, LLP; Michael H. Minns

(57) ABSTRACT

A lift for lifting motorcycles, ATV's, or any similar vehicle. The lift includes a base, an upright extending from the base, a four-bar load-transferring lifting mechanism, a lifting frame adapted to engage the vehicle, and an operator for lifting and lowering the lifting frame.

4 Claims, 3 Drawing Sheets

U.S. PATENT DOCUMENTS

| | | | | |
|---|---|---|---|---|
| 2002/0113230 | A1* | 8/2002 | Creel et al. | 254/131 |
| 2004/0007697 | A1* | 1/2004 | Petrone et al. | 254/10 B |
| 2005/0189526 | A1* | 9/2005 | Bettencourt | 254/10 B |

* cited by examiner

MOTORCYCLE LIFT

This applications claims priority from provisional application Ser. No. 60/452,848, filed Mar. 7, 2003. Application Ser. No. 60/452,848 is hereby incorporated by reference.

BACKGROUND OF THE INVENTION

Up until recently, there have only been two types of motorcycle lifts available in the industry. One type was designed for the do-it-yourselfer who performs light duty repairs, light duty accessory installation and cleaning. This low cost consumer model does not offer the safety and stability required to change tires and wheels and perform heavy duty repair or installation work. Heavy duty repair or installation work requires pulling, and pushing forces against the motorcycle. Professional motorcycle table lifts provide the necessary safety and stability. The professional table lift is powered by air, air over hydraulics or hydraulic systems. The larger size professional table lift is more expensive and often times requires optional equipment for the various service and repair operations. For example, the professional lift table is supporting the motorcycle by its contact with the tires. If one of the tires has to be changed, an optional scissors jack must be used under the motorcycle frame to lift one of the tires off the table and a hinged section or trap door of the table must open up to remove or install the wheel combination.

In recent years, a third type of lift entered the market that would accomplish the same tasks as the professional lift table, but at a much lower unit cost and taking up much less shop space or garage. Another benefit of this third lift type is the manner of lifting the motorcycle. This lift does not incorporate a lifting table that contacts the motorcycle tires. Instead, this lift contacts the motorcycle frame beneath the engine and transmission, leaving both tires and wheels free for the various tire and wheel related repairs or replacement. Still, the third lift type requires adapters for lifting different classifications of motorcycles (cruiser, dirt bike, sport, sport touring, touring or custom chopper). A third benefit of this third lift type is that it can be made affordable for the do-it-yourselfer.

The third type requires numerous adapters to accommodate different motorcycle types. Currently, adapters are required when specific pickup points change, such as frame height and frame width. For example, if a motorcycle has a low clearance, such as on a custom chopper, an adapter is required because without the adapter, the lift could not get low enough to get under the motorcycle. Because various adapters are required, costs to consumers actually rise since they are forced to purchase various lift adapters to accommodate their broad range of uses. Thus, there is a need for a motorcycle lift that requires fewer adapters while still providing lifting capabilities to a broad range of motorcycles.

Therefore, in light of the foregoing deficiencies in the prior art, the applicant's invention is herein presented.

SUMMARY OF THE INVENTION

In one aspect, this invention is accomplished by providing a base; an upright extending from the base; a four-bar load-transferring lifting mechanism, a portion of the upright being one bar of the four-bar mechanism; a lifting frame adapted to engage the vehicle, a portion of the lifting frame being another bar of the four-bar mechanism; and an extendable operator, operably connected to the four-bar mechanism and the lifting frame.

In another aspect, this invention is accomplished by providing a base having a floor support and an upright extending from the base; a lift frame; a four-bar mechanism operatively attached to the lift frame and the base, a portion of the upright being one bar of the four-bar mechanism, a portion of the lift frame being another bar in the four-bar mechanism; and an operator pivotally attached to the four-bar mechanism and the base, wherein the operator is moveable between an extended position and a retracted position and wherein the operator includes a control for controlling a rate of movement from the extended position to the retracted position.

In an additional aspect, this invention may be accomplished by providing a base; a lift frame; two parallel spaced apart bars, the bars being pivotally attached to the base and the lift frame; and an operator pivotally attached to the base and one of the parallel bars, wherein the base includes a horizontal base and an upright extending vertically from the base and wherein the lift frame includes a vehicle support frame and a vertical member extending from the support frame.

In another aspect, this invention may be accomplished by providing a base; a lift frame; a lever having a first end pivotally attached to the lift frame and a middle portion pivotally attached to the base; an operator pivotally attached to the base and a second end of the lever, the operator being movable between a retracted position and an extended position; and a stabilizing link pivotally attached to the lift frame and the base, wherein the stabilizing link is parallel to and spaced from the lever and wherein the operator is a hydraulic jack.

These along with other objects and advantages of the present invention will become more readily apparent from a reading of the detailed description taken in conjunction with the drawings.

DETAILED DESCRIPTION OF THE INVENTION

Figure 1:
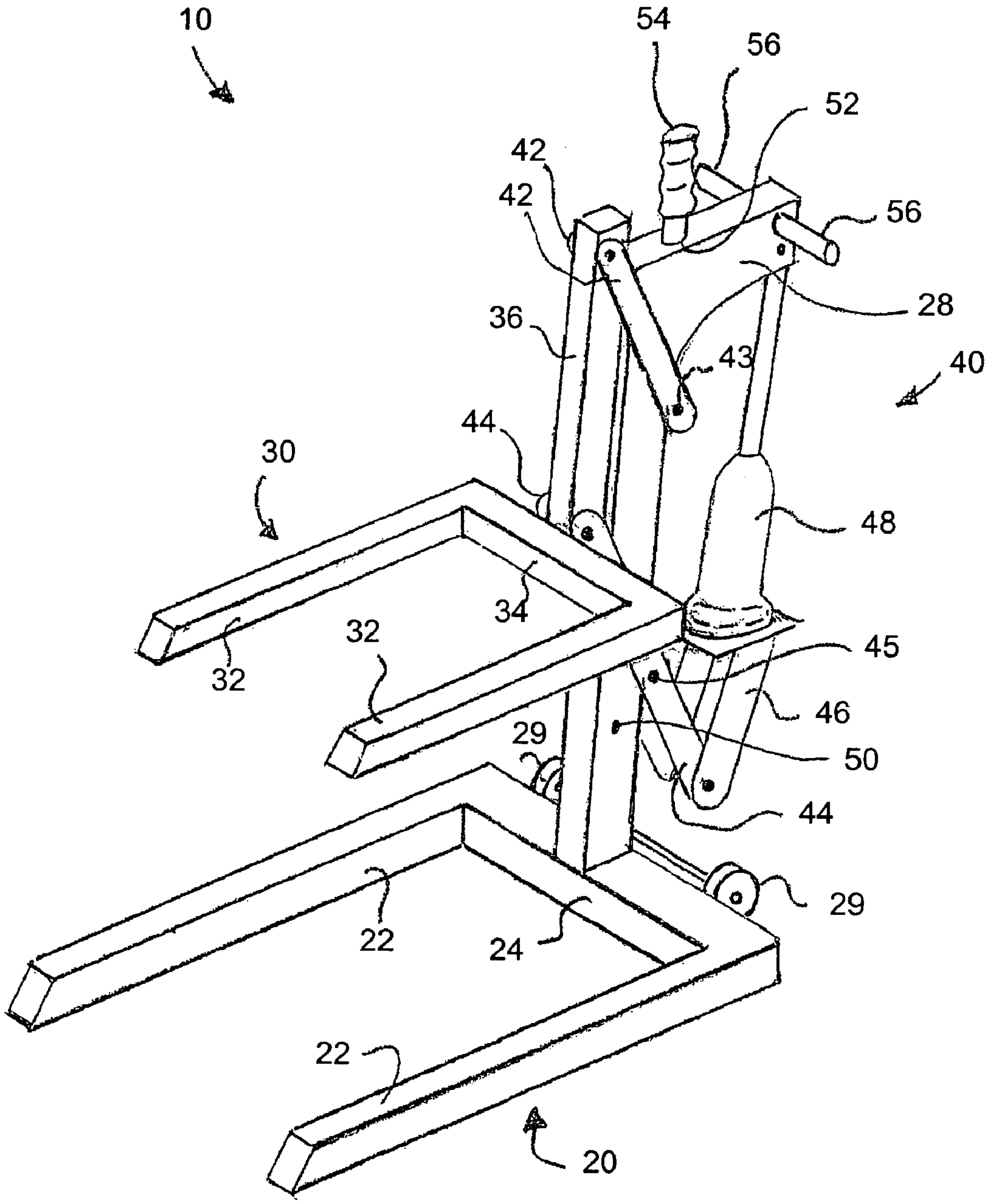
FIG. 1 is a perspective view of a lift, in accordance with a preferred embodiment of the present invention showing a raised position.
Figure 2:
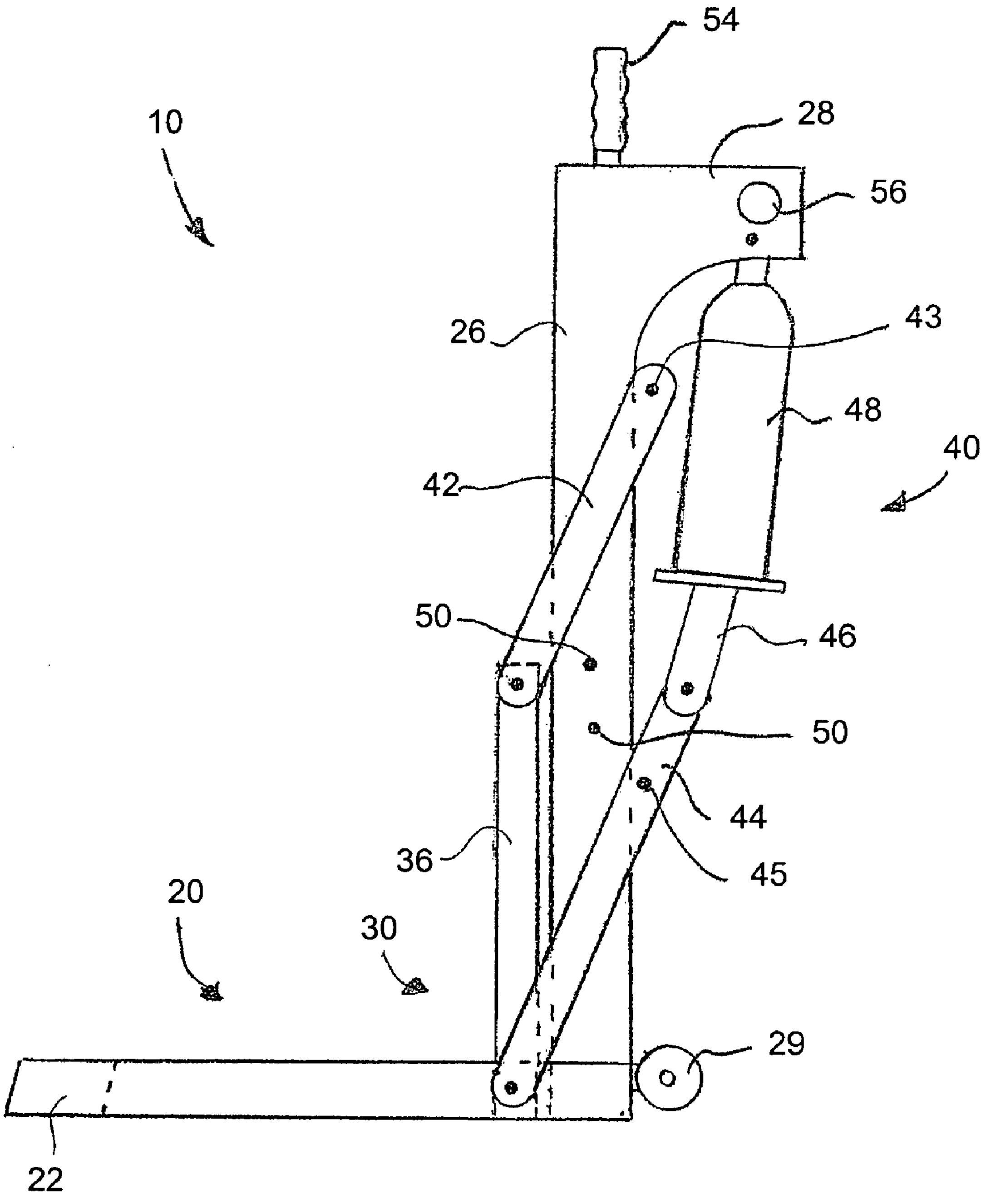
FIG. 2 is a side view of the lift as shown in FIG. 1 showing a lowered position.
Figure 3:
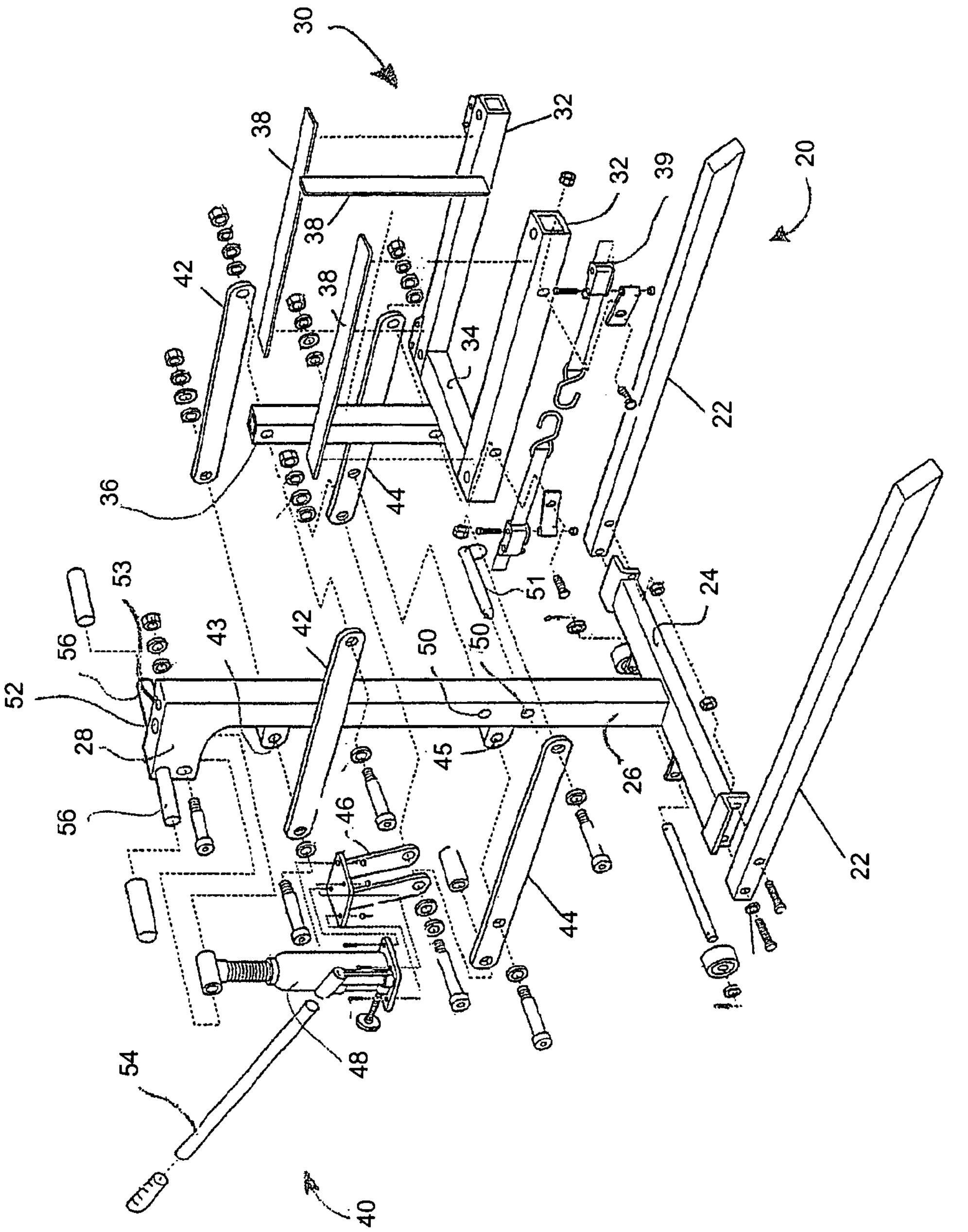
FIG. 3 is an exploded perspective view of the lift as shown in FIG. 1.

In FIGS. 1–3, the lift 10 is shown in a preferred embodiment. The lift 10 essentially consists of a base 20, a lifting frame 30, and a lifting system 40. Lift 10, in a preferred embodiment, may be used to lift motorcycles of all type, other small vehicles, lawn mowers and other home outdoor equipment, and personal water craft In another embodiment, lift 10 can be made to handle larger vehicles, such as ATV's, golf carts, and tractors, by increasing the dimensions of or the material used for the structural members. While all structural members are made of steel in a preferred embodiment, it is contemplated that the structural members may be made of aluminum, wood, or fiberglass composite.

Base 20 comprises legs 22, a main member 24, and an upright 26. Two legs 22 extend from the main member 24 along the ground plane substantially parallel to each other. Because the purpose of the base 20 is to stabilize and support the lifted load, there may be occasions where additional stability or strength is needed. Thus, it is contemplated that the legs 22 may extend away from each other, so to provide additional stability to the lift 10. It is also contemplated that the legs 22 may be connected to each other by an additional member along their lengths or at their ends to provide additional strength and stability. The upright 26 extends vertically from the main member 24. Although it is not necessary, in a preferred embodiment, the upright 26 is angled slightly away from the legs 22, meaning the angle between the plane created by legs 22 and the upright 26 is slightly more than 90 degrees. This provides additional strength and allows the lift 10 to deform without causing structural damage to or failure of lift 10. Upright 26 includes an extension 28, which is located at the top portion of upright 26. Extension 28 provides a mounting for extendable operator 48, as operator 48 is mounted to extension 28. A storage hole 52 may be located in upright 26 to store jack operating lever 54 when lever 54 is not in use. Additionally, wheels 29 may be attached to the back of the main member 24, allowing the lift 10 to be tilted upon wheels 29 and maneuvered by utilizing handles 56 and rolling the lift 10 on the wheels. Preferably, wheels 29 are not in contact with the ground when base 20 is resting on the ground plane.

The lifting frame 30 comprises arms 32, a cross-member 34, and a vertical member 36. The arms 32 extend from cross-member 34 parallel to each other and slightly away from the ground plane, to compensate for deflections that occur under heavy loading. As with the base 20, it is contemplated that arms 32 may extend away from, and not parallel to, each other for increased stability. Also, an additional member may connect arms 32 along their lengths or at their ends to provide additional strength. Protective layer 38, which may consist of foam or rubber pads or any other protective material, may be placed on the contact surface of arms 32 and vertical member 36 to prevent surface damage to the vehicle. Lifting frame 30 may be of different designs to accommodate different applications. The current design is applicable to motorcycles and ATV's having an exposed underbody frame. Lifting frame 30 may be removed and replaced with other designs capable of handling other applications, such as motorcycles and ATV's that have plastic ground effects or other features which enclose the underbody frame. Tie down straps 39 may be used to secure and stabilize the vehicle when it is resting on the lifting frame 30, more specifically the arms 32. Tie down straps 39 may be secured to arms 32 on the arm side and/or bottom. A single strap or multiple straps may be secured to each arm 32.

The lifting system 40 comprises upper links 42, lower links 44, operator links 46, and operator 48. Upper links 42 and lower links 44 connect lifting frame 30, via vertical member 36, to base 20, allowing lifting frame 30 to move vertically relative to the stationary base 20. Specifically, upper links 42 and lower links 44 connect to upright 26 via upper pivot 43 and lower pivot 45, respectively, forming a four-bar mechanism with vertical member 36 and upright 26. In a preferred embodiment, pivot points 43, 45 consist of pins running through bored stock material joined to the back of upright 26 by means such as welding or bolting. It is contemplated that pivot points may instead run though upright 26 by boring holes through upright 26. Lower links 44 also connect to operator links 46 at the end opposite lifting frame 30. This mounting configuration allows the lower links 44 to act as a lever, whereby operator 48 pushes down on one end of the lower links 44, pivoting the lower links 44 around pivot point 45, and lifting the opposite end of the lower links 44 and thus lifting frame 30. Upper links 42 then act as a stabilizing bar to ensure a smooth rotation and translation of lifting frame 30. Links 42, 44 may each comprise pairs, where there are two upper links 42 and two lower links 44 (as shown) mounted on opposite sides of upright 26. It is contemplated that instead of pairs, a single upper link 42 and a single lower link 44 may be used, whereby both are mounted on the same side of upright 26. Operator 48 is attached to upright extension 28 and operator links 46. In a preferred embodiment, operator 48 is a hydraulic jack with a release valve modified to restrict the return flow of the hydraulic fluid into the reservoir when the load is released to control the lowering rate; however, it is contemplated that a hydraulic cylinder, a pneumatic cylinder, or a screw may be used in place of the hydraulic jack.

Lift 10 functions to lift motorcycles, ATV's, and other similar vehicles to varying heights. In a preferred embodiment, the invention 10 is capable of lifting low clearance vehicles, as referenced above, having an exposed underbody frame. This is because the only clearance required is the height of the base 20 and lift frame 30. But also in a preferred embodiment, the lifting frame 30 is readily removable to allow other lifting frames to be used when the application dictates.

To lift a vehicle contemplated by this invention, the operator 48 is initiated which drives the lower links 44 to pivot about lower pivot point 45, thus raising lifting frame 30 with the guidance of upper links 42. Although the operator 48 may be capable of stopping movement at any time, thus suspending the vehicle at any desired user-defined heights, holes 50 may be formed into upright 26. Holes 50 would run parallel to pivot points 43, 45, allowing a pin 51 capable of maintaining the vehicle load to be inserted. This pin essentially acts as a locking pin, to hold the lift 10 in a locked raised position. An additional storage hole 53 is provided in upright 26 to hold locking pin 51 when not being used to hold the lift 10 in a locked raised position. This lift 10 provides a compact, cost effective, and reliable lift, capable of lifting a broad range of vehicles. It is contemplated that different lift 10 sizes may be required depending on the vehicle being lifted. For instance, larger ATV's may require a stronger lift 10, which would require larger structural members, additional structural members, or even different material. In addition, different heights may be required based upon the end-user requirements, of which would require longer and stronger links 43, 45, and ultimately a stronger upright 26 and longer base arms 22.

Although the present invention has been described in connection with the preferred embodiments, it will be appreciated by those skilled in the art that modifications can be made and alternatives utilized without departing from the spirit and scope of the present invention.

What I claim is:

1. A lift for lifting a small vehicle, such as a motorcycle or an all-terrain vehicle, comprising:

a base including an upright extending from the base;

a lifting frame adapted to engage the vehicle, the lifting frame comprising: a frame cross member; a vertical member operably attached to the frame cross member; a first lifting arm; and, a second lifting arm, each lifting arm extending from either end of the cross member;

a four-bar load-transferring lifting mechanism comprising at least a portion of the upright; at least a portion of the vertical member of the lifting frame; an upper bar; and, a lower bar, the upper bar and lower bar being spaced apart and pivotally attached to the upright, where a mid-point of one of the upper bar and the lower bar being pivotally attached to the upright, a first end of said one of the upper and the lower bar extending on a first side of the upright and a second end of said one of the upper and the lower bar extending on a second side of the upright, the first side being opposite the second side; and an extendable operator, operably connected to the lifting frame, wherein the upright includes an upper pivot point for the upper bar and a lower pivot point for the lower bar, the pivot points located along and offset laterally from the upright.

2. A lifting mechanism comprising:

a base comprising a horizontal base and an upright extending vertically from the base;

a lift frame comprising a vehicle support frame and a vertical member operably attached to the support frame;

two parallel spaced apart links, the links being pivotally attached to the base and the lift frame; and an extendable operator pivotally attached to the base and one of the parallel bars, wherein one of the parallel spaced apart links has an end extending from its point of attachment away from the base, the operator being attached to said end.

3. A lift comprising:

a base;

a lift frame;

a first link having a first end pivotally attached to the lift frame and a middle portion pivotally attached to the base;

a hydraulic jack pivotally attached to the base and a second end of the first link, the hydraulic jack being movable between a retracted position and an extendable position; and a second link pivotally attached to the lift frame and the base, the second link being parallel to and spaced from the first link.

4. The lifting mechanism according to claim 2, wherein said one of the parallel spaced apart links has said end extending from its point attachment away from the upright.

* * * * *